United States Patent [19]

Katzenschwanz

[11] Patent Number: 4,801,236

[45] Date of Patent: Jan. 31, 1989

[54] MECHANICAL INVENTORY STORAGE AND DELIVERY CABINET

[75] Inventor: Norbert Katzenschwanz, Neuburg, Fed. Rep. of Germany

[73] Assignee: Karl Mengele & Söhne GmbH & Co., Günzburg, Fed. Rep. of Germany

[21] Appl. No.: 844,826

[22] Filed: Mar. 27, 1986

[30] Foreign Application Priority Data

Apr. 6, 1985 [DE] Fed. Rep. of Germany ....... 3514932

[51] Int. Cl.⁴ .................. B65G 1/127; B65G 1/137
[52] U.S. Cl. .................. 414/416; 198/483.1; 414/787
[58] Field of Search ............... 414/331, 787, 417, 416, 414/661, 280; 312/268; 198/483.1, 858, 859, 345

[56] References Cited

U.S. PATENT DOCUMENTS

| | | | |
|---|---|---|---|
| 3,403,794 | 10/1968 | Lopez | 414/280 |
| 3,570,647 | 3/1971 | Meikle et al. | 198/858 X |
| 3,883,203 | 5/1975 | Lexe | 312/268 |
| 3,902,773 | 9/1975 | Gondek | 414/787 |
| 4,018,325 | 4/1977 | Rejsa | 312/268 X |
| 4,239,445 | 12/1980 | Ozawa | 198/345 X |
| 4,516,318 | 5/1985 | Kirschenman | 198/345 X |
| 4,582,990 | 4/1986 | Stevens | 414/416 X |
| 4,615,429 | 10/1986 | Arase | 414/280 X |
| 4,641,740 | 2/1987 | Grecksch et al. | 198/483.1 X |

FOREIGN PATENT DOCUMENTS

| | | | |
|---|---|---|---|
| 2259745 | 2/1978 | Fed. Rep. of Germany | |
| 59-149206 | 8/1984 | Japan | 312/268 |
| 2093249B | 12/1981 | United Kingdom | |

Primary Examiner—Robert J. Spar
Assistant Examiner—David A. Bucci
Attorney, Agent, or Firm—Toren, McGeady & Associates

[57] ABSTRACT

A mechanical cabinet for storing and delivering inventory, wherein carrier units having inserts are selectively delivered to a delivery station by a conveyor mechanism which includes a vertical conveyor having an endless chain and sprocket wheels. The inventory items are contained within inserts in the carrier units, and when a carrier unit is located at the delivery station, an ejection device arranged on a side of the carrier unit opposite the delivery station operates to eject the inserts in order to make the inventory items available. The ejection device is provided with a drive which is switched to alternate with a drive which is provided for the carrier units.

15 Claims, 9 Drawing Sheets

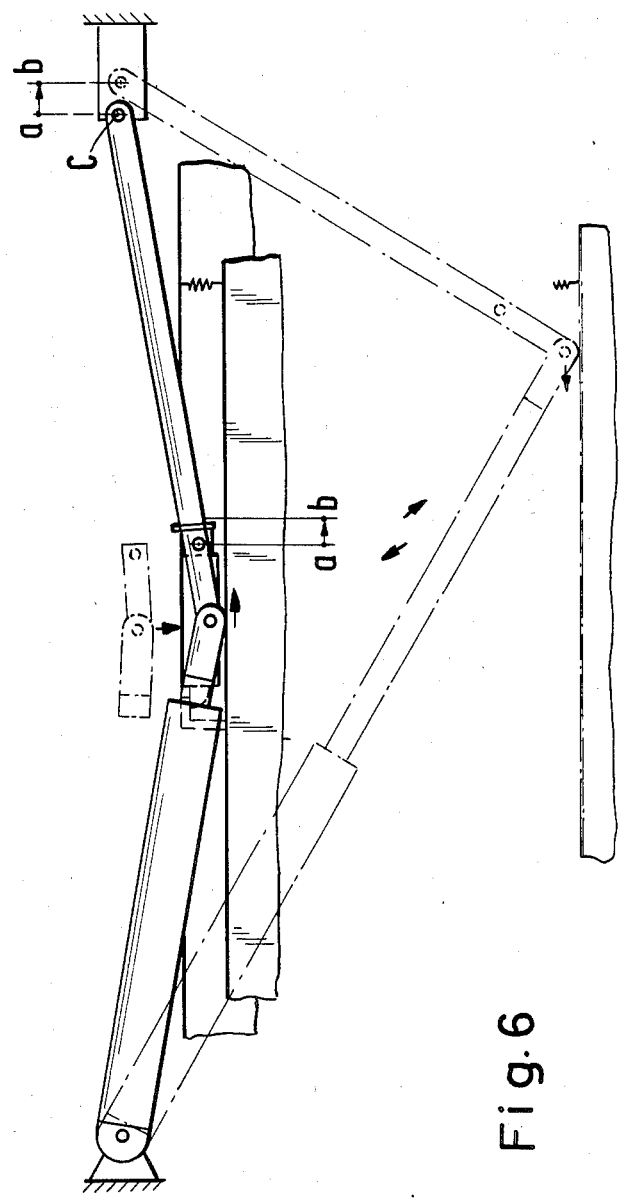

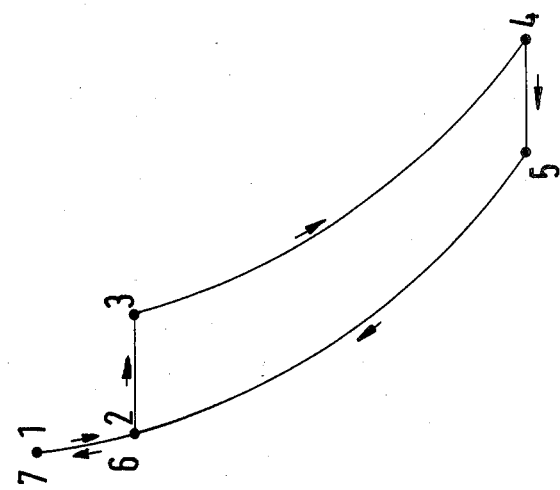

MECHANICAL INVENTORY STORAGE AND DELIVERY CABINET

The present invention is particularly directed toward storage inventory and delivery mechanisms, and more particularly to a mechanical cabinet containing carrier units with slide-in members which are powered so as to be elevated and lowered toward at least one delivery or issue station at which inventory items may be retrieved.

The invention is directed more particularly to a mechanical cabinet of the type which may, for instance, be equipped with drawers which can be pulled out and locked or in which the goods to be stored may be stored directly, for instance, in inserts separated by lateral partitions. The partitions may comprise cassettes, drawer compartments, and a conveyor device including a vertical conveyor mechanism is provided, wherein the carrier units may be suspended on endless chains guided over sprocket wheels.

The potential advantages of mechanical cabinets of this type are not fully realized for use, for example, in archives and warehouses, particularly where small parts are to be stored which require long travel distances for retrieval if goods stored in a single cabinet row are to be commissioned or consigned. The operator using such cabinets must, first of all, select a desired carrier unit and then a delay occurs until the carrier unit reaches the delivery station at which access to the stored material may be obtained by pulling out one slider unit. This type of handling is time consuming.

For example, in the prior art, DE-PS No. 30 48 394 discloses a mechanism wherein time expenditure for access is shortened in that the position of the selected inserts or boxes is optically indicated after the carrier units have reached the removal position. However, this also assumes the presence of operating personnel for the selection of the compartments or the insert and the observation of the removal position and actuation of a removal process. If the stored goods are distributed among several systems, long, time-consuming search operations and travel times will tend to arise.

SUMMARY OF THE INVENTION

Accordingly, the present invention is directed toward providing a device by means of which at least the search and access efforts may be facilitated and whereby automated commissioning may also be possible.

The arrangement in accordance with the present invention involves providing at the side of the carrier units opposite to the issue or delivery station at least one ejection device for the inserts or cassettes, or the like, and by switching their drives so as to alternate with that of the carrier units.

Particularly, in the case of stored goods located directly on a carrier unit, the invention provides for the solid anchoring of the carrier unit which is respectively in the issue position prior to issue and to actuate this device timewise before the ejection device.

Furthermore, the present invention enables several inserts to be brought in rapid succession or simultaneously to the same plane and the inserts of several cabinet units may be accessed by hand into the accessed position. Furthermore, with the invention, it is also possible to transact all commissioning functions by means of an external data carrier automatically through a connected electrical data processing installation and a conveying device contiguous with the issue or delivery station.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DESCRIPTION OF THE DRAWINGS

In the drawings:

FIG. 6 is a modified embodiment of the ejection device;

FIGS. 6a and 6b are schematic flow diagrams showing movement sequences of points of the mechanism of the invention.

DETAILED DESCRIPTION OF THE PREFERRED EMBODIMENTS

Figure 1:
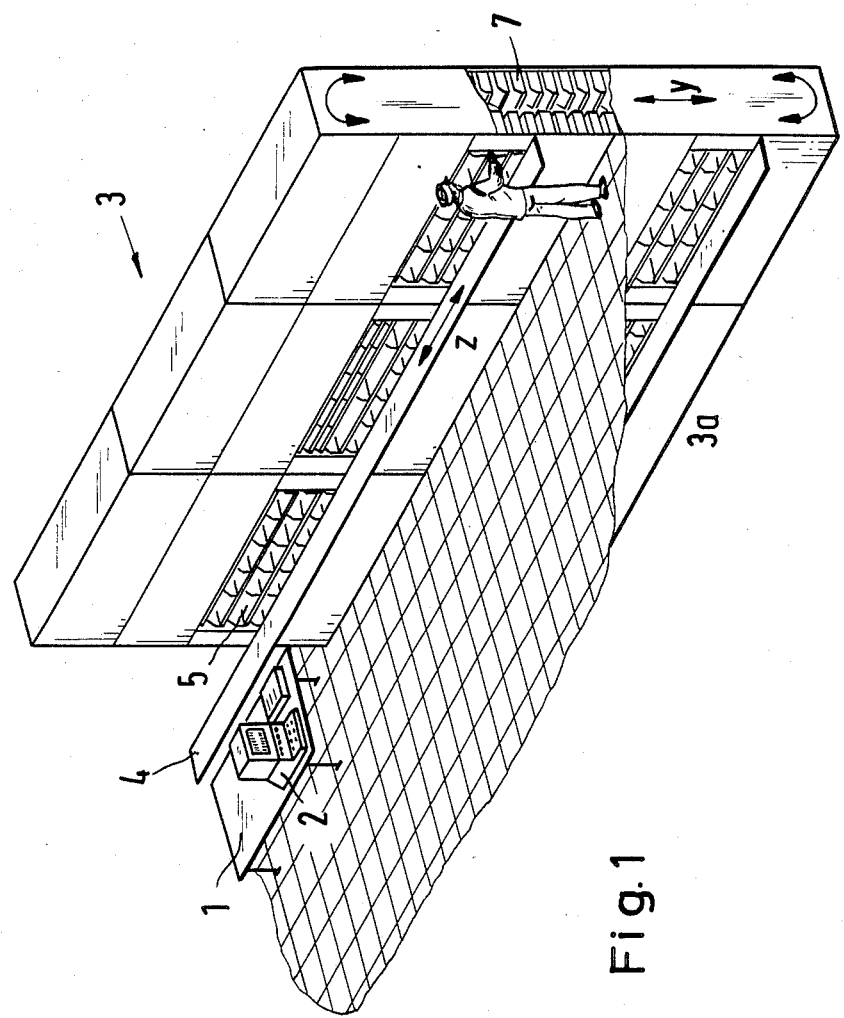
FIG. 1 is a schematic perspective view showing an automated small-parts store in accordance with the present invention.

Referring now to the drawings and particularly to FIG. 1, there is shown an overall mechanism in accordance with the present invention wherein a central commissioning point is designated with reference numeral 1 and an EDP (electronic data processing) station is identified with reference numeral 2. The mechanism contains a row 3 with vertical conveyor cabinets and a merchandise input is located on a lower floor 3a of the building.

A conveyor belt 4 is arranged from the commissioning point 1 to the output openings 5 of the vertical conveyor cabinet.

Figure 4:
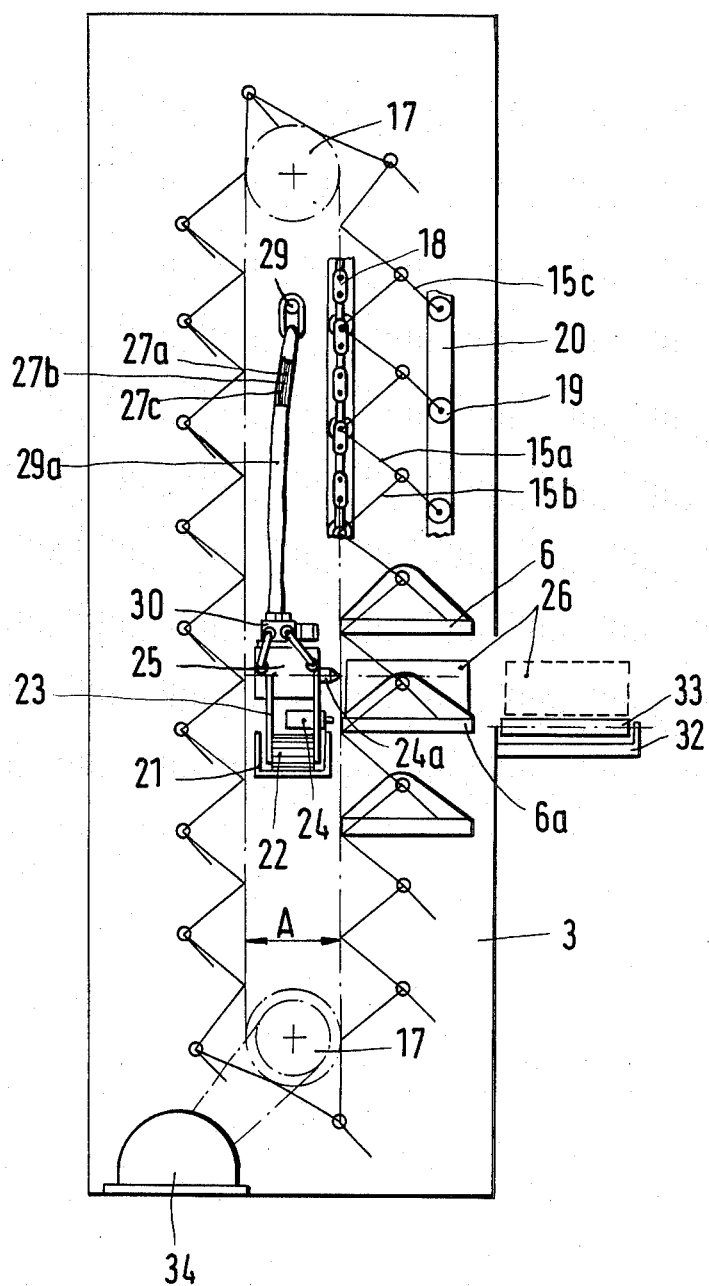
FIG. 4 is a schematic side elevation of a vertical conveyor mechanism utilized with the mechanism of FIG. 1 having an ejection device in accordance with the present invention.

Carrier units 6 of the vertical conveyor cabinets 3 are arranged to carry merchandise baskets 7 (FIG. 1) and 26 (FIG. 4). In the embodiment according to FIG. 2, lockable drawers 10 are provided in the carrier unit 6. A handling system for material withdrawal from the drawers 10 which may be sensor-guided and which may furthermore be arranged so as to be laterally displaceable and also to move in the X-Y axes is arranged here at a guidance rail 60.

As is illustrated in FIG. 4, in the case of the vertical conveyor cabinet 3, carrier units 6 are suspended at lateral consoles and carrier arms 15a and 15b are connected therewith in an articulated manner and guided at endless chains 18 revolving over sprocket wheels 17. Steadying levers 15c guided with rollers 19 and rails 20 are solidly connected with the carrier arms.

In the invention, a horizontal U-shaped rail 21 extends in a central free space A corresponding to the diameter of sprocket wheels 17, the rail being attached to the frame of the cabinet 3 (not visible in FIG. 4). This rail is designed at its base with teeth, and a trolley 23 is driven by a pinion 22 so as to be displaceable on the rail 21 at which an arresting device 24 for the carrier unit 6 as well as an ejection device 25 for the commodity or material baskets 26 conveyed on the carrier units 6 is arranged in accordance with the invention.

The ejection device 25 consists of a double-acting telescopic cylinder. The arresting device 24 consists of a double-acting piston rod cylinder and the drive of the trolley 23 of a hydraulic motor. Pressure hoses 27a and 27b together with control lines 27c are connected with a magnetic valve 30 and are combined in a tailing or dragging hose 29a guided on a rail 29.

Initially, the arresting device 24 is actuated by the magnetic valve 30 in a sequential control operation which presses the carrier unit, identified in FIG. 4 as 6a, which is respectively in the delivery or issue position against a stop 31 (see FIG. 4a) of a table or board 32. The ejection device 25 is actuated by the magnetic valve 30 so that the commodity basket 26 located upon the carrier unit 6a is pushed onto a conveyor belt 33 arranged above the table 32.

Figure 4A:
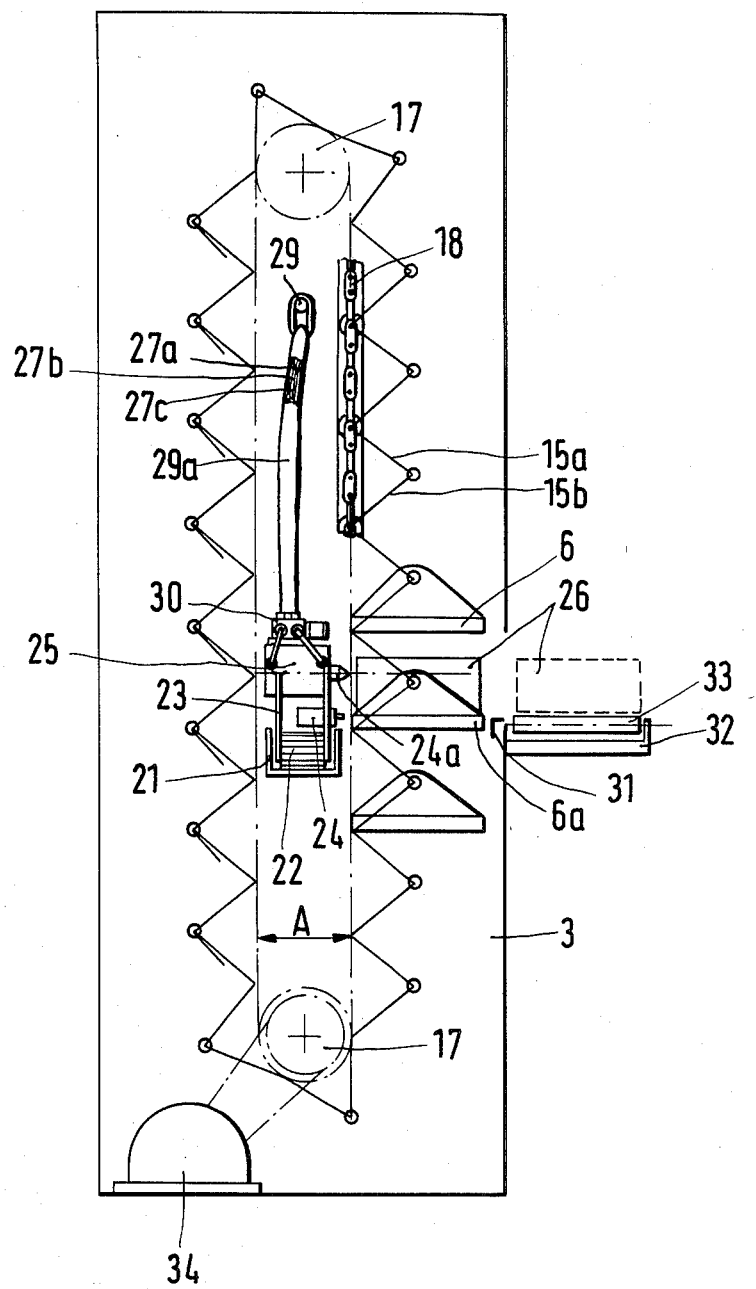
FIG. 4a shows the vertical conveyor mechanism of FIG. 4 with a modified detail.

In a sequential control and in the case of the embodiment of FIG. 4a the arresting device 24 may be actuated first, which, with its piston rod 24a, pushes the carrier unit 6a respectively into the issue position against the stop 31 of the table 32.

After that, both devices are again returned to their original position. During these movements, a drive 34 for the carrier unit 6 is blocked. For actuation of inserts, such as drawers 10 shown in FIG. 2, with a vertical conveyor cabinet usually containing at least two or three thereof, preferably expander arm arrangements 35 are used in accordance with the embodiments of FIGS. 5 and 6. These consist of expanding arms 38a and 38b supported with rotary joints 36a and 36b at spindle nuts 37a and 37b. The spindle nuts 37a, 37b are driven by spindles 40 supported in bearing blocks 39a and 39b, each of which are provided with right-hand and left-hand threads on the left-hand side and on the right-hand side of a shaft collar 41 thereof. A motor 42 drives the spindle 40 and the two other ends of the expanding arms 38a, 38b are connected with each other with a knee joint 43 with a roller 44 being supported at the articulation axis thereof. Arresting hooks 45a and 45b come into engagement with detent slits 46a and 46b of anchoring pieces 47 which are arranged on the rear side of the drawers 48. A locking device 49 is arranged at the left side of the drawer, whose lock 49a is released shortly after actuation of the ejection device by an adjusting cam 50 arranged with a rotary joint 50a at the spindle nut 37a and being in abutment on it at 50b. A tension spring 50c returns this device in a reverse direction.

A modified embodiment of the ejection device of the invention having central unlocking and detenting is schematically illustrated in FIG. 6. Here, as the sequence of motion in FIGS. 6a and 6b shows, the expanding arm arrangement is laterally moved by a distance a-b by means of a device (not shown) and thereby the function described above is effected.

Figure 7:
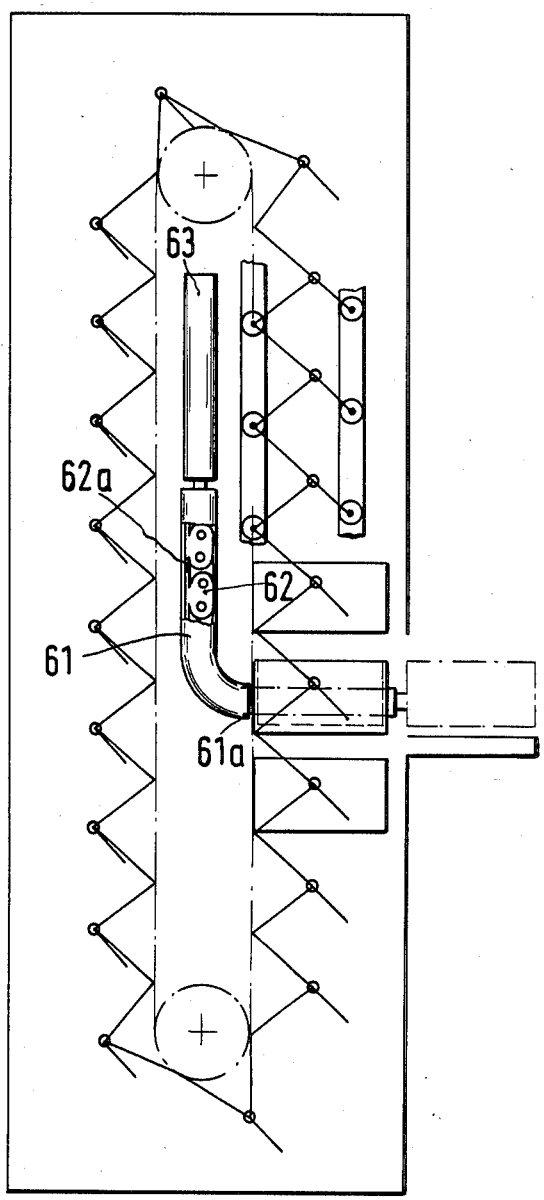
FIG. 7 is an elevational view of the vertical conveyor, wherein another modification of the ejection device is shown.

According to FIG. 7, the ejection device consists of a link chain 62, guided in a tube 61, whose plates 62a equipped with stops after having reversed direction into a horizontal ejection device abut at the angle of tube end 61a so that the chain is self-supporting in this horizontal position.

Figure 2:
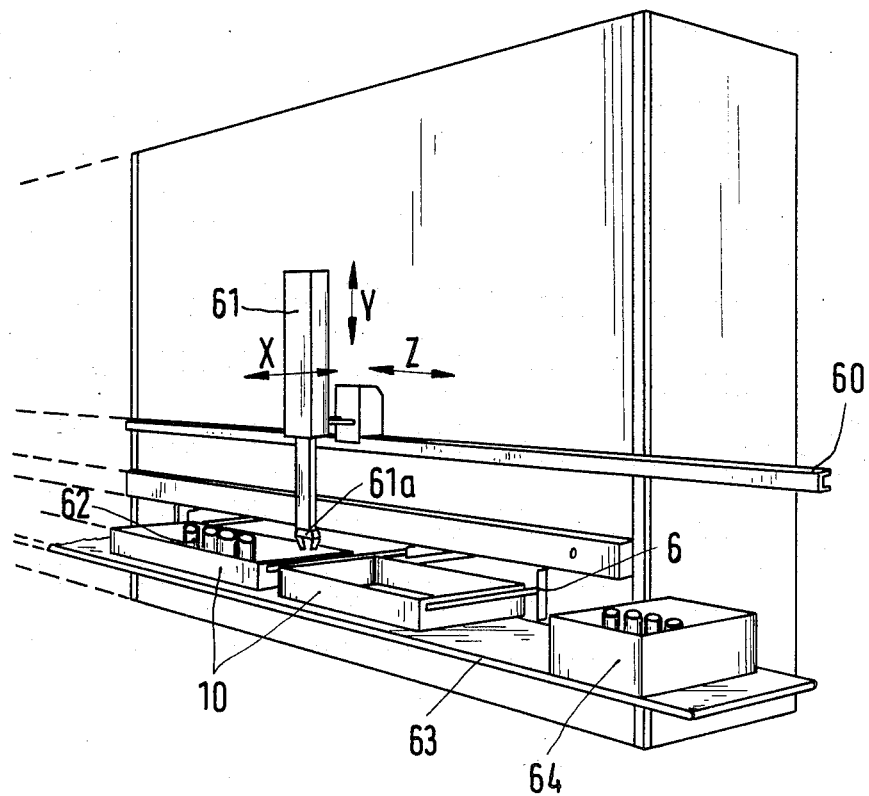
FIG. 2 is a schematic perspective view showing a modified detail of the automatic small-parts store in accordance with FIG. 1.
Figure 5:
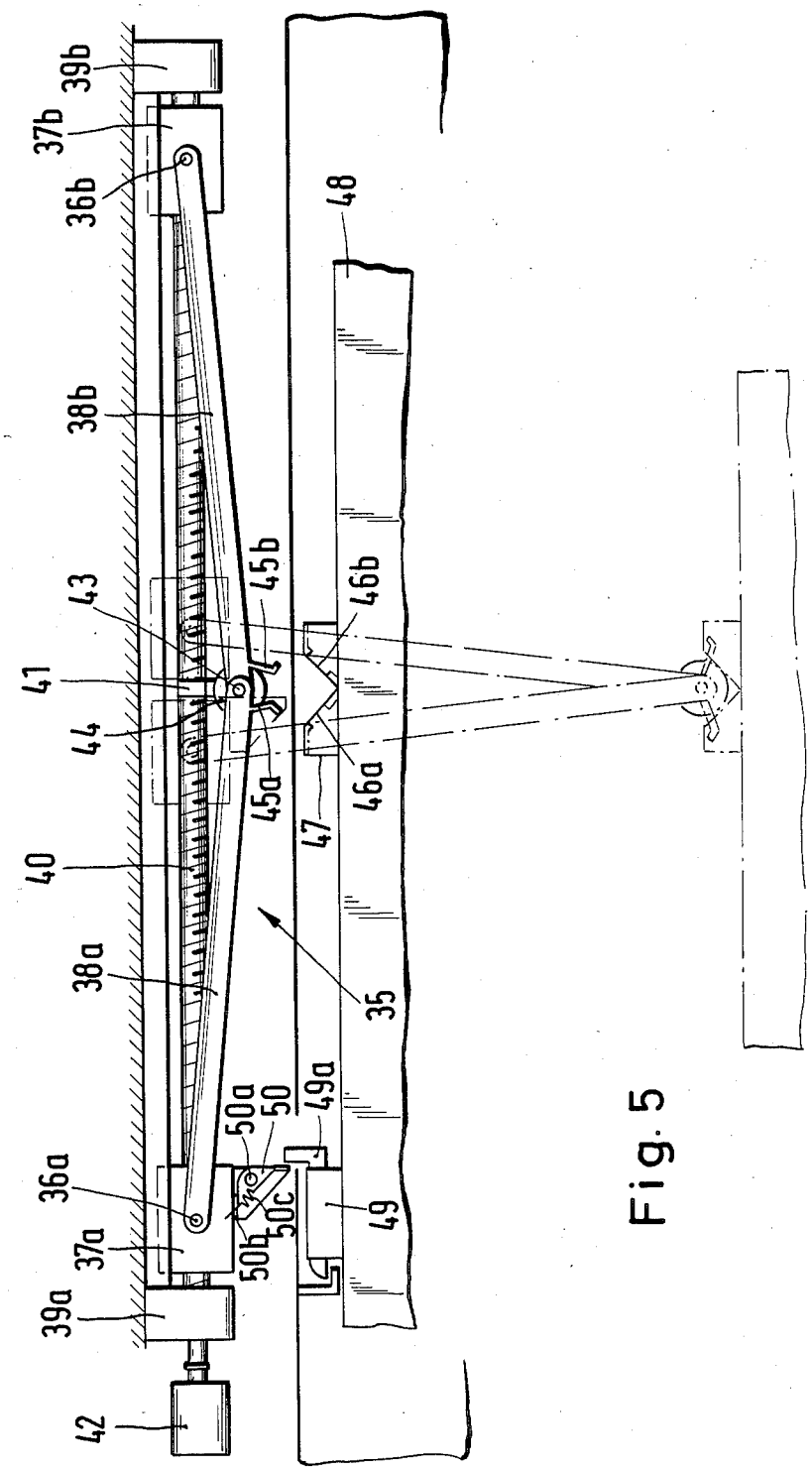
FIG. 5 is a plan view showing a different embodiment type of ejection device according to FIG. 2.

In the vertical conveyor cabinet shown in FIG. 2, a sensor guided handling system 61 is arranged on a runner rail 60 which removes different smaller parts 62 with a grapple 61a from the drawers 10 ejected, for instance, according to FIG. 5, and transports these into a commodity basket 64 waiting on a conveyor belt 63 on the front face.

Figure 3:
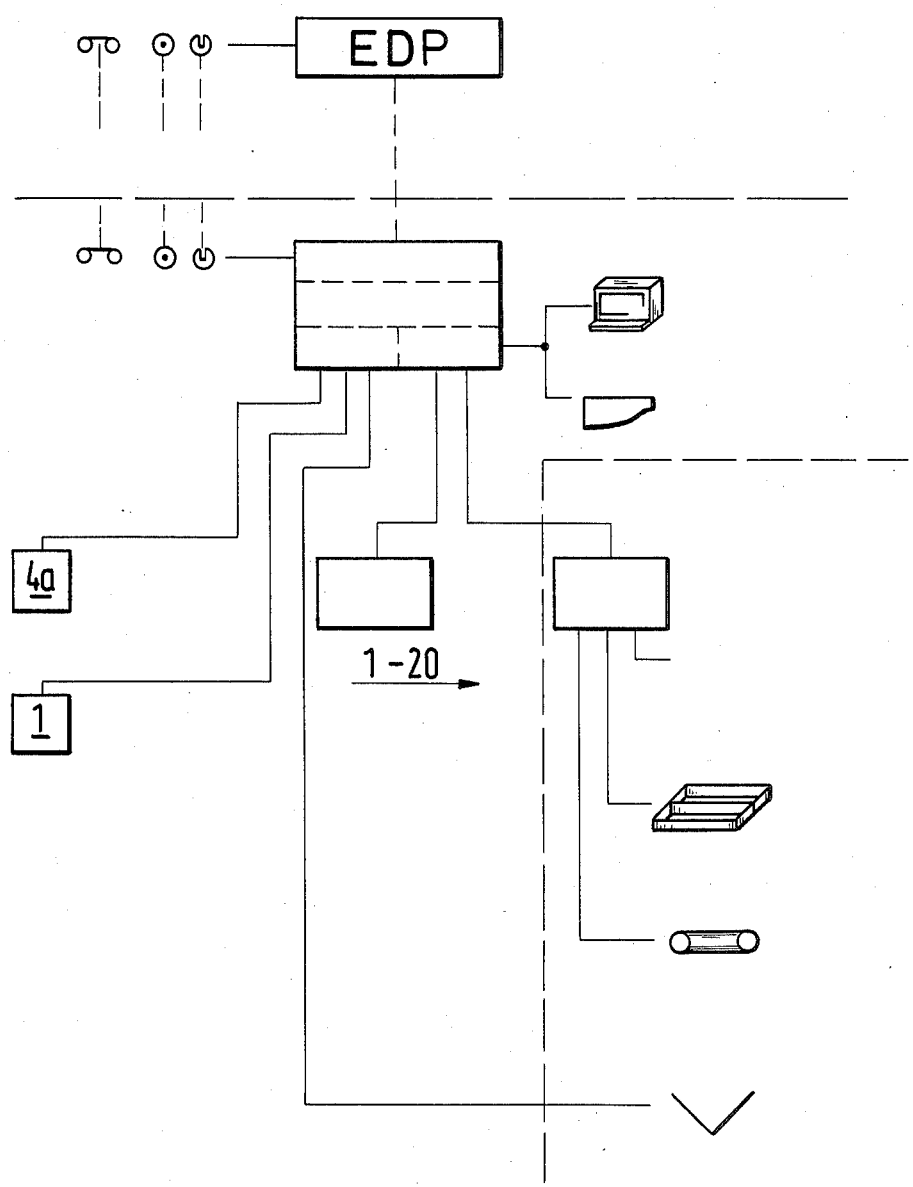
FIG. 3 is a schematic diagram of the structure of the system and the material flow.

The type of function of the described warehouse is as follows: The system receives instruction data on an external data carrier, as is illustrated in FIG. 3, or from a connected EDP installation. The respective search and issue condition is shown on the screen of the EDP connection 2, shown in FIG. 1, at the commissioning point 1.

A computer determines in which carrier unit and in which insert the warehouse commodity is located and transmits these data to a microprocessor on the basis of the article numbers contained in the instruction. The appropriate carrier unit is brought to the issue station by means of the sprocket wheels 17 and the drive chain 18 in the Y-axis, for example, FIG. 4. Simultaneously and in a timewise parallel manner, the trolley 23 is moved in the Z-axis or the handling device 61 (FIG. 2) is moved to the insert being searched and the carrier unit 6 is arrested or immobilized by the arresting device 24, as described. The ejection device 25 is extended and the commodity basket 26 or the article is pushed onto the conveyor belt 33. Thereby, all positions of an instruction to the cabinet 3 concerned can be processed individually or all cabinets 3 can be processed simultaneously, whereby no articles are ejected onto an already occupied conveyor belt portion because of sensor monitoring and appropriate feed control.

When all positions of an instruction or commission have been transacted, the computer receives the execution signal and all articles are directly conveyed to the commissioning point 1 for packaging or into a commodity basket or the like positioned thereat. The vertical conveyor cabinets 3 are replenished upon receipt of reloading signals in the portion 3a on the lower floor.

The restocking of the commodities to be warehoused can occur in analogous fashion with appropriately adapted devices of the type described.

Thus, with the present invention, it will be seen that the mechanical cabinet, in accordance with the invention, is provided with the arresting device 24 which anchors the carrier unit 6 respectively located at the issue position C in a stationary manner at least during the issue and loading cycles and which is actuated timewise before the ejection device 25 or 35 or 61, 62. The ejection device 25 or 35 or 61, 62 is capable of being coupled and decoupled with the insert 10 or 48 by means of a coupling link 45 together with an opposing coupling link 46 and 47 (FIG. 5).

The locking devices 50 of the drawers 10 and 48 can be releasably actuated simultaneously by means of the coupling engagement.

Furthermore, it will be seen that the ejection device consists of a spreadable articulated lever system 36-47. Furthermore, the ejection device may consist of a linkage system comprising a crank with attached coupling link.

The ejection devices 25, 36-47 are arranged displaceably at a horizontal guide 21 with respect to the individual inserts or boxes. The ejection device 35 is driven through the spindle 40 and the reversible motor 42.

Also, the ejection device may be driven by a linear motor.

Both arms 38a, 38b of the ejection device 35 are supported with a sliding parts 37a, 37b at a spindle 40, the sliding part 37a, 37b engaging at the arm end.

Arresting hooks 45a, 45b are arranged in such a way at the knee 43 of the spreading lever 38 or at one or both ends of the crank with attached coupling link that, during advance of the ejection device 36–47, the lock 45 is inserted into a detent 46a, 46b at the insert (drawer 48).

The vertical conveyor device defining the free space A between the sprocket wheels enables the ejection device to be arranged in the free space in the vertical conveyor cabinet. In the embodiments of FIGS. 4 and 4a, it will be seen that the arresting device 24 consists of a piston 24a pressing the carrier unit 6 against a stationary stop 31 into a trough provided there.

The ejection device may be designed at its front as a fork for gripping wide inserts.

In the device shown in FIG. 2, the invention is characterized in that, above the issue station, the guide rail 60, for instance, a toothed rack, is arranged extending transversely to the ejection device and a trolley driven by a pinion or the like with a sensor guided handling system 61 for removal of small parts 62 and the like from drawers 10 by means of a grapple 61a.

In the arrangement according to the present invention, the conveyor belt 33 is arranged at the issue station, for example, at a cabinet row of the vertical conveyor cabinet 3 at a table 32 which is connected with a central commissioning point 1 or commodity basket and, for example, from here, the stored commodity in the vertical conveyor cabinet insert 7, 26 is delivered from storage by means of external data carriers through the EDP connection 2 and is delivered in the Y and Z axes.

The mechanical cabinet 3 comprises material replenishment units 3a on at least an additional floor.

A table transom with an additional conveyor belt in front of the insertion opening is provided at the side opposite to the issue station and the carrier unit is also free at this side, and above or beneath it, a guide rail, for instance, a toothed rack, is arranged transversely to the insertion extraction direction at the cabinet or the cabinet row. Here, a trolley with the ejection or arresting devices 24, 25, 36–47 and 61/62 and, in the free space A, a stop corresponding to the stop 31 is assigned.

The openings which lie successively opposite from the free area A at the cabinet to the ejection and possibly arresting devices 24, 25, 36–47, 61/62 are provided to be symmetrically effective toward both sides and they actuate inserts such as the drawers 10 and 48.

The present invention provides a process for fully automated input and output storage of material in inserts of cabinets or shelves arranged horizontally next to each other and vertically above each other, characterized in that one row of the insert rows arranged above each other is moved in a vertical direction Y to the issue point and then one of the inserts or the storage material is displaced into an issue position in the X-axis and then the storage material of individual or several inserts is moved in the Z-axis to a collecting area, and possibly, the input or insertion is executed in reverse sequence.

While specific embodiments of the invention have been shown and described in detail to illustrate the application of the inventive principles, it will be understood that the invention may be embodied otherwise without departing from such principles.

What is claimed is:

1. A mechanical inventory storage and delivery cabinet comprising:

carrier units located within said cabinet extending in a first horizontal direction and having inserts adapted to contain therein inventory items to be stored and delivered;

conveyor means including a vertical conveyor mechanism having endless chain means and sprocket wheels for conveying said carrier units in the vertical direction within said cabinet;

means defining a delivery station for said cabinet extending in the first horizontal direction and spaced outwardly from said cabinet at which said inventory items can be delivered;

control means for controlling said conveyor means to selectively deliver said carrier units to said delivery station;

an ejection device arranged on an opposite side of said carrier units from said delivery station for ejecting inserts from said carrier units when said carrier units are located at said delivery station, said ejection device being horizontally displaceably arranged along a horizontally extending guide with respect to said inserts for movement in the first horizontal direction and in a second horizontal direction transverse to said first horizontal direction, said sprocket wheels defining a vertically and horizontally extending free space therebetween with said ejection device being arranged in said free space defined by said sprocket wheels; and first drive means for said ejection device switched to alternate with a second drive means of said conveyor means for said carrier units.

2. A cabinet according to claim 1, further providing an arresting device which anchors said carrier units respectively located at said delivery station in a stationary manner at least during an issue and loading cycle and which is actuated timewise before said ejection device.

3. A cabinet according to claim 1, further comprising means for coupling and decoupling said ejection device with said inserts, the means for coupling and decoupling comprising arresting hooks on said ejection device and co-operating detent slips on said insert.

4. A cabinet according to claim 3, wherein said inserts include locking devices which can be releasably actuated simultaneously by means of the coupling and decoupling means.

5. A cabinet according to claim 1, wherein said ejection device comprises a spreadable articulated lever system.

6. A cabinet according to claim 1, wherein said ejection device comprises a linkage system comprising a crank with attached coupling link.

7. A cabinet according to claim 1, wherein said ejection device is driven through a spindle and a reversible motor.

8. A cabinet according to claim 1, wherein said ejection device comprises a pair of arms which are supported with a sliding part at a guideway, said sliding part engaging at an arm end.

9. A cabinet according to claim 8, wherein said pair of arms comprise a spreading lever having a knee with a lock arranged at said knee in such a way that during advance of said ejection device, said lock is inserted into a detent at said insert.

10. A cabinet according to claim 1, wherein said delivery station means comprises a delivery table and a conveyor belt provided on said delivery table.

11. A cabinet according to claim 2, wherein said arresting device consists of a piston pressing said carrier unit against a stationary stop.

12. A cabinet according to claim 1, wherein said ejection device is designed with a front portion shaped as a fork for gripping said inserts.

13. A cabinet according to claim 2, wherein above said delivery station said horizontally extending guide further comprises a guide rail with a trolley on said guide rail being driven by a pinion having a handling system for removal of small parts from said inserts by means of a grapple being provided thereon.

14. A cabinet according to claim 1, wherein said delivery station means comprises a conveyor belt, said conveyor belt being connected with the central control point of said control means whereby inventory items may be delivered from storage, the control means comprising external data carriers through an electronic data processing connection and delivered in a Y and Z axis.

15. A cabinet according to claim 1, wherein said cabinets comprise material replenishment units on at least an additional floor spaced vertically from the delivery station.

* * * * *